United States Patent [19]

Lindemann et al.

[11] Patent Number: 4,498,108

[45] Date of Patent: Feb. 5, 1985

[54] SCREEN FOR REPRODUCING CONTINUOUS-TONE PICTURES

[75] Inventors: Eckhard Lindemann, Raisdorf; Wolfgang Neumann, Schleswig, both of Fed. Rep. of Germany

[73] Assignee: Dr.-Ing. Rudolf Hell GmbH, Raisdorf, Fed. Rep. of Germany

[21] Appl. No.: 465,904

[22] Filed: Feb. 14, 1983

Related U.S. Application Data

[63] Continuation of Ser. No. 221,361, Dec. 29, 1980, abandoned, which is a continuation of Ser. No. 962,655, Nov. 21, 1978, abandoned.

[51] Int. Cl.³ .............................................. H04N 1/22
[52] U.S. Cl. ..................................... 358/283; 358/298
[58] Field of Search .................... 358/283, 298; 354/5, 354/6; 178/30; 340/728, 729, 730, 731, 793, 795, 796

[56] References Cited

U.S. PATENT DOCUMENTS

| 3,688,033 | 8/1972 | Hell et al. | 178/15 |
| 3,806,641 | 4/1974 | Crooks | 358/283 |
| 3,911,480 | 10/1975 | Brucker | 358/283 |
| 3,982,949 | 9/1976 | Reymond | 96/116 |

Primary Examiner—Joseph A. Orsino, Jr.
Attorney, Agent, or Firm—Brisebois & Kruger

[57] ABSTRACT

A screen for reproducing continuous-tone pictures of the kind which has an orthogonal, equally spaced screen structure and which is rotated through 45° from the direction of scanning. In this invention, the individual screen dots are split up into four parts by lines extending parallel and perpendicular to the direction of reproduction which pass through the centers of the screen dots, thus producing square part screen-configuration which, in two opposite corners, each contain covered segments which derive from two different screen dots. Prior to reproduction, one such screen-configuration is stored for each tonal value liable to occur and at the time of reproduction these are called up again for selected tonal values and reproduced under the control of the scanning process.

8 Claims, 6 Drawing Figures

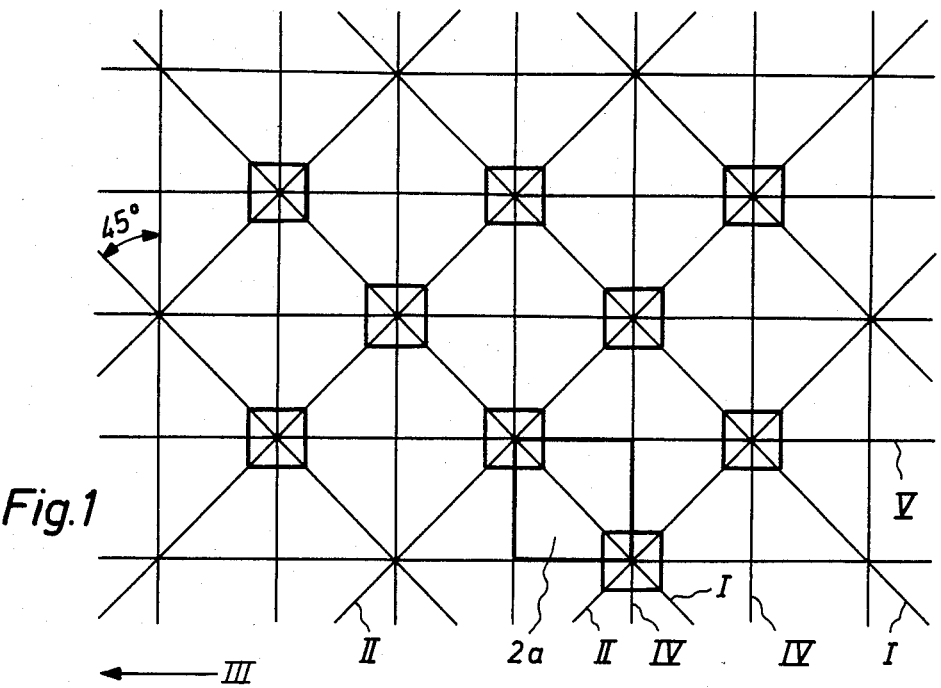
Fig.1
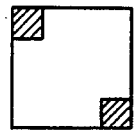
2a
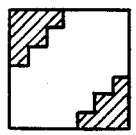
2b
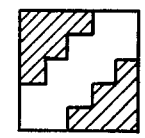
2c
Fig. 3
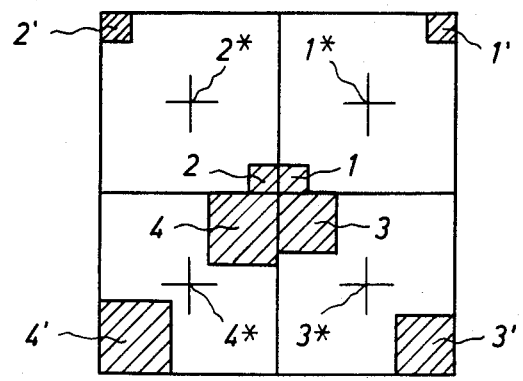
Fig. 4

SCREEN FOR REPRODUCING CONTINUOUS-TONE PICTURES

This is a continuation, of application Ser. No. 221,361 now abandoned, filed Dec. 29, 1980; which was a continuation of Ser. No. 962,655, filed Nov. 21, 1978 now abandoned.

BACKGROUND OF THE INVENTION

The present invention relates to screens for reproducing continuous-tone pictures of the kind having an equally-spaced screen structure and which is rotated from the direction of reproduction by 45°. Such a screen will hereinafter be referred to as "of the kind described".

In reproduction technology, there are a multiplicity of known reproduction screens for continuous-tone pictures, and a method of reproduction which is frequently employed is to trace out the individual screen-dots at the time of reproduction by means of a light beam, the various screen dots which occur in the case of individual total values having been stored in a store in the form of digitally coded reproduction data and, when the picture is being reproduced, being called up from the store and reproduced again under the control of the control of the scanning process. This method is for example described in U.S. Pat. Spec. No. 3,688,033. In this specification, the reproduction process is described using the example of the reproduction of continuous-tone pictures by means of electronic photosetting apparatus. The method may however also be applied to so-called drum or flat-bed reproducing apparatus, and in this connection reference may for example be made to U.S. Pat. Spec. No. 3,725,574. Good results are achieved with the said method, but there are applications in which extremely high quality is required. It has been found, particularly when reproducing outlines, that the optimum standard of reproduction is not achieved, which is attributable to the physical distribution of the information within the screen dots reproduced. Therefore, with the known method, additional circuits must be provided to take into account the area surrounding a scanned dot, which involves additional complication.

It is an object of the invention therefore to provide an improved screen of the kind described.

SUMMARY OF THE INVENTION

Accordingly, the invention consists in a screen of the kind described, wherein the individual screen dots are divided into four parts by lines extending parallel and perpendicular to the direction of reproduction which pass through the centres of said screen dots, thus producing square party screen-configurations which each contain, in two opposite corners, covered segments which derive from two different screen dots, and wherein prior to the reproduction a screen configuration of this kind is stored for each tonal value liable to occur and in the course of reproduction is called up again for selected tonal values and reproduced under the control of the scanning process.

BRIEF DESCRIPTION OF THE DRAWINGS

In order that the invention may be more clearly understood, reference will now be made to the accompanying drawings which show some embodiments by way of example and in which:

FIG. 1 shows a screen grid,

FIGS. 2a, 2b and 2c show some examples of screen dots,

FIG. 3 shows a further example of screen dot,

FIG. 4 shows an example of the displacement of the centre of area of a reproduced screen dot.

DETAILED DESCRIPTION OF PREFERRED EMBODIMENTS

Referring now to the drawings, in FIG. 1 is shown screen grid in which the screen dots are situated at the intersections of mutually orthogonal, equally spaced lines I and II which are rotated from the direction of reproduction III through an angle of 45°. Screens of this kind are known and are often used in single-colour printing, or in multicolour printing for one or two of the mutually rotated screens used for the individual colour separations. However, what are now introduced are mutually perpendicular lines IV and V which extend through the centers of the screen dots and which lie parallel and perpendicular and parallel respectively to the direction of reproduction III. These lines produced part screen configurations which are orientated orthogonally to the direction of reproduction III and which each contain, in two opposite corners, two covered segments which belong to two different screen dots.

FIGS. 2a to 2c show some examples of such part screen-configurations, FIG. 2a presenting the area outlined by a heavy line in FIG. 1. For the reproduction of a continuous-tone picture, a screen-configuration of this kind is stored for each tonal value likely to occur, as described in U.S. Pat. Spec. No. 3,688,033. The storage of the screen dots and the way in which they are called up again when reproducing the continuous tone picture will not be described in detail here since the relevant details can be found in U.S. Pat. Spec. No. 3,688,033.

It should however be mentioned that when storing these screen-configurations a very large saving of storage space can be achieved since the covered segments from the individual screen dots are symmetrical and the screen-configurations for heavy tonal values can be obtained from the configurations for light tonal values simply by reversing the colour information, as can be seen from FIG. 3 for example. The screen dot configuration in FIG. 3 can be obtained from the configuration in FIG. 2b or 2c simply by reversing the colour information. What is achieved in this way is that a relatively large number of tonal values can be represented using only a few stored screen-dot configurations.

A particular advantage of this screen system lies in the fact that when reproducing outlines the centre of area of the screen dots can be situated off the intersections of lines IV and V because the four parts which together form a screen dot may be different sizes. This means that at outlines the centre of area of the screen dots can be shifted towards the outline, which results in a picture of better quality.

Also, with this screen allowance is automatically made for the area surrounding a dot, which does not occur in this simple form with other methods of reproduction. FIG. 4 shows an example of such a screen dot in which the centre of area has been displaced towards an outline as a result of the division of the screen dot into four parts. The screen dot is made up of four parts 1 to 4 and its centre of area has moved away from the centre towards part 4. The reason for this is that when scanning the original a higher tonal value was found in the region reproduced by covered segments 4 and 4' than in region 1, 1' or 2, 2'. In each case the scanning takes place at the period of the lattices.

In FIG. 4 the points of scanning are marked 1\*, 2\*, 3\* and 4\* and it can be seen that the tonal value information found by scanning causes the centre of area of the screen dot as a whole to be displaced towards the scanned point at which the greatest density was found in the original. This means that by dividing up the screen dot into four parts, the surrounding area is allowed for in all four quadrants with only twice the number of scan lines. In a prior U.S. Pat. Spec. No. 3,646,262, with double the number of scanning lines for example it is only possible to allow for the surrounding area perpendicularly to the direction of scanning.

We claim:

1. A 45° screening pattern half-tone reproduction comprised of a multiplicity of tonal screen dots extending in a pattern of diagonal equally spaced lines perpendicular to each other and at an angle of 45° to the direction of scan during reproduction, with dots at intersections of the lines, each tonal dot being divisible into four adjoining dot parts by lines parallel to and orthogonal to the direction of scan and passing through said intersections, diagonally adjacent tonal dots having substantially equal diagonally adjacent dot parts, and the center of area of each of said tonal dots being determined by the respective areas of the four adjoining dot parts forming a tonal dot, and wherein the four adjoining dot parts forming at least some of said tonal dots of the reproduction are of different size from each other so that the center of area of such dots is offset from said intersections.

2. A half-tone reproduction according to claim 1 wherein the size of all four adjoining dot parts of a plurality of the tonal dots of said reproduction are different.

3. A method of making a 45° screening pattern half-tone reproduction comprising, scanning an original in parallel lines to obtain data indicative of the tonal value at equally spaced regions of the original, forming in the 45° screening pattern in the reproduction a plurality of equally spaced dots of tonal values corresponding to the tonal values of the original by separately forming four adjoining quarter sections of each dot, and while forming each quarter section of a dot, substantially simultaneously forming a similar quarter section of a diagonally adjacent dot.

4. A method according to claim 3 wherein diagonally adjoining quarter sections of at least some of said tonal dots are different from each other.

5. A method of forming a half-toner screen for reproducing an original as a half-tone comprised of a multiplicity of tonal screen dots extending in a pattern of diagonal equally spaced intersecting screen lines at the same acute angle to the direction of scan during reproduction, said method comprising, forming each tonal dot in four adjoining quarter sections, at one intersection of the screen lines, by separately forming a first quarter section and then a second quarter section, and subsequently separately forming a third quarter section and then a fourth quarter section, and while forming each quarter section of said tonal dots, substantially simultaneously forming a quarter section of a diagonally adjacent tonal dot.

6. A method according to claim 5 wherein said forming of the adjoining quarter sections of at least some of the tonal dots comprises forming adjoining quarter sections of areas of different size so that the center of area of at least some of the tonal dots is offset from the intersections of the screen lines.

7. A method according to claim 5 wherein said forming of a quarter section of a tonal dot and a quarter section of a diagonally adjacent tonal dot comprises forming quarter sections of substantially the same areas.

8. A method according to claim 5 wherein said dots of the screen extend along 45° screen lines which are perpendicular to each other.

* * * * *